Figure 1:
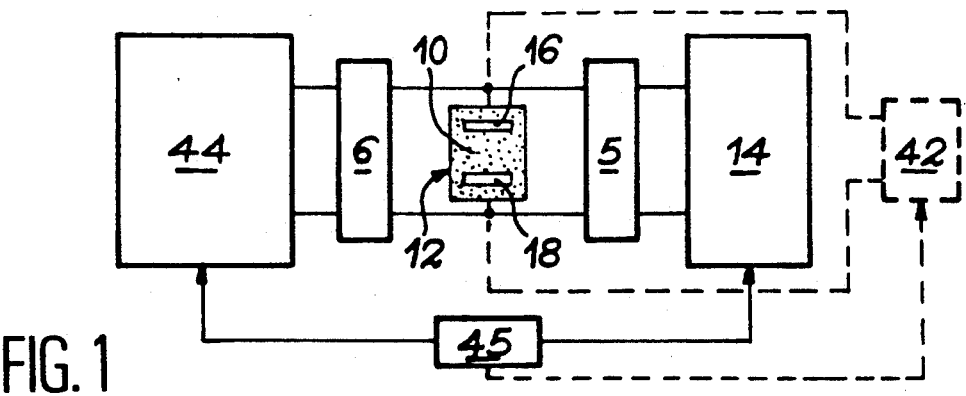

United States Patent [19]

Gidon et al.

[11] Patent Number: 5,291,510
[45] Date of Patent: Mar. 1, 1994

[54] ELECTRIC POWER SUPPLY FOR LASER

[75] Inventors: Serge Gidon, Tulette; Pierre Vulliez, La Garde Adhemar; Bernard Hennevin, Decines, all of France

[73] Assignee: Commissariat a l'Energie Atomique, Paris, France

[21] Appl. No.: 820,356

[22] Filed: Jan. 14, 1992

[30] Foreign Application Priority Data

Jan. 30, 1991 [FR] France .................... 91 01049

[51] Int. Cl.$^5$ .............................................. H01S 3/09
[52] U.S. Cl. .................................... 372/69; 372/38; 372/34; 372/78
[58] Field of Search ................. 372/38, 78, 25, 34, 372/69, 56, 59

[56] References Cited

U.S. PATENT DOCUMENTS

| 4,112,392 | 9/1978 | Andersson et al. | 372/61 |
| 4,224,579 | 9/1980 | Marlett et al. | 372/59 |
| 4,232,274 | 11/1980 | Tokudome et al. | 372/59 |
| 4,698,819 | 10/1987 | Hirth et al. | 372/86 |
| 4,701,925 | 10/1987 | Fuke et al. | 372/56 |
| 4,956,845 | 9/1990 | Otto et al. | 372/56 |
| 5,138,627 | 8/1992 | Friede et al. | 372/86 |

OTHER PUBLICATIONS

2287 Soviet Journal of Quantum Electronics 20 (1990) Jan., No. 1, New York, US pp. 20-23. "Active Element Utilizing Copper Vapor for High Power Master-Oscillator-Amplifier Laser Systems" by N. A. Lyabin et al.
Journal of Physics E. Scientific Instruments, vol. 21 No. 4, Apr. 1988, pp. 388-392 "Design and Performance of a 20 Watt Copper Vapour Laser" by: J. K. Mittal.
2287 Soviet Journal of Quantum Electronics vol. 7 No. 12 (Dec. 1978) "Discharge Heated Copper Vapor Laser" pp. 1454-1455 by: H. Kneipp and M. Rentsch.

Primary Examiner—Léon Scott, Jr.
Attorney, Agent, or Firm—Hayes, Soloway, Hennessey, Grossman & Hage

[57] ABSTRACT

An electric power supply for a laser includes a heating module (44) connected to the electrodes (16,18) of an enclosure (12) containing an active material, and supplies an electric pulse for the vaporization of the active material. An excitation module (14) supplies an electric pulse for exciting the active material. As the operation of the laser is repetitive, the excitation pulse preionizes the active material with a view to triggering the heating pulse.

12 Claims, 2 Drawing Sheets

ELECTRIC POWER SUPPLY FOR LASER

DESCRIPTION

The present invention relates to an electric power supply for a laser. It more particularly applies to the heating and excitation of the active material of different lasers and in particular the metal in metal vapour lasers.

In the conventional manner the metal vapour is produced by the so-called autoheating of the laser enclosure, such as is described in the article by T.C. Wang, Rev. Sci. Ins., Oct. 89, pp. 3351/2.

Electric discharges heat metal balls to a high temperature (approximately 1000° to 1500° C.). These electric charges are supplied in pulse form by an electric excitation module. They also carry out an electron bombardment of the vaporized metal giving rise to the excitation of the atoms, namely the population inversion, thus permitting the generation of light beam by stimulated emission. The front of a pulse is used for the excitation, whilst its tail brings about the heating of the enclosure for the following excitation. Thus, excitation and heating are coupled.

Several problems are caused by the coupling between the excitation and the heating, carried out by the same electric pulse. In particular, the regulation of the thermal operating point of the laser cannot be modified without necessarily modifying the excitation of the vapour. In addition, the increase in the laser dimensions with a view to increasing its power makes higher electrical energies necessary. However, respecting the brevity of the electric pulse times is incompatible with an increase in the energy supplied by the hitherto used means, such as large thyratron devices or semiconductor switches associated with a magnetic compression.

A device is known in which the heating and excitation are decoupled. An example is e.g. provided in an article by B. Singh, "Compact externally heated discharge tube for metal vapor laser", published in Rev. Sci. Inst., 55(10), Oct.84, pp.1542/4. In this article, a heating resistor envelopes the enclosure and thus permits the vaporization of the metal. However, the distribution of the temperatures obtained with this external heating within the enclosure is not favourable to the satisfactory, high frequency operation of the laser.

The object of the present invention is to obviate these disadvantages. For this purpose it recommends an apparatus where the excitation and heating are decoupled, but both are obtained by electric discharges and therefore in an internal manner.

More specifically, the invention relates to an electric power source for a laser, which comprises an active material, the power source comprising an excitation module supplying electric pulses for exciting the active material and also a heating module supplying electric pulses for heating the active material too and maintaining it at a temperature at which the laser effect occurs, following the excitation of the material, as well as means for permitting the alternating, recurrent operation of the excitation and heating modules.

According to an embodiment, the heating module is constituted by an externally triggered, pulsed current source.

According to another embodiment, the heating module comprises a voltage source having two terminals A and B, a capacitor connected in parallel to the terminals A and B of the voltage source, a switch connected to the terminal A of the voltage source and a saturatable inductance connected at a point C to the switch.

According to a variant of the latter embodiment, the heating module also comprises at least one magnetic compression stage having a capacitor connected to a saturatable inductance.

Advantageously, the means for permitting the alternating operation of the excitation and heating modules comprise a high-pass filter connected in parallel at the output of the excitation module and a low-pass filter connected in parallel at the output of the heating module.

The electric power supply can have igniting means for igniting discharge operation.

The separation of heating and excitation makes it possible to use reduced energy exciting pulses for the same lighting power obtained. It also makes it possible to control these two parameters (heating and exciting) independently of one another.

In addition, the separation of the heating and excitation makes it possible to use, for producing heating pulses, devices operating under a low voltage (approximately 1000 V). Apart from the fact that the use of high voltage (approximately 20 kV) is limited to excitation, the reduction of the voltages used makes it possible to avoid or reduce damped oscillations appearing in this type of laser, so as to permit a better available heating module energy absorption.

A heating or excitation module connected to the enclosure containing the active material forms a R-L-C circuit. The value of the inductance L is fixed and is due to the geometry of the circuit. The energy supplied to the enclosure for heating or excitation is proportional to C and the voltage applied to the square.

It is known that the critical damping resistance R is inversely proportional to the root of C. For heating, a low voltage operation makes it possible to have a high capacitance, which reduces the value of the critical resistance R of the circuit and therefore facilitates the damping of oscillations.

The invention is described in greater detail hereinafter relative to non-limitative embodiments and the attached drawings, wherein show:

FIG. 1 diagrammatically a general view of a laser provided with a power source according to the invention.

Figure 2:
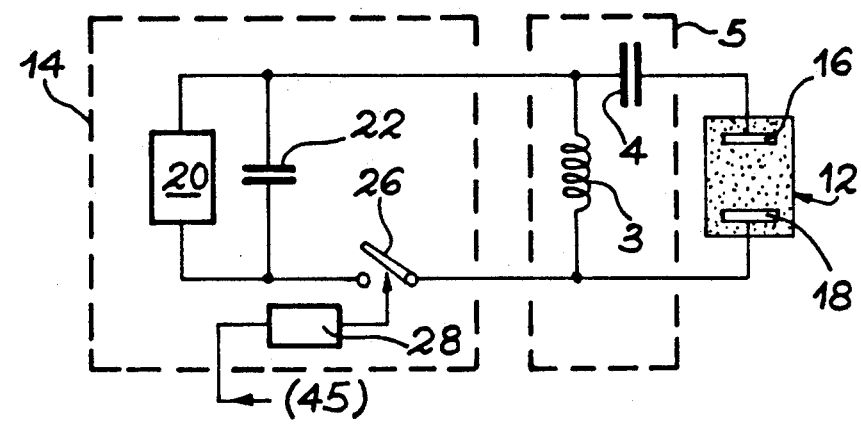

FIG. 2 diagrammatically an embodiment of an excitation module.

Figure 3:
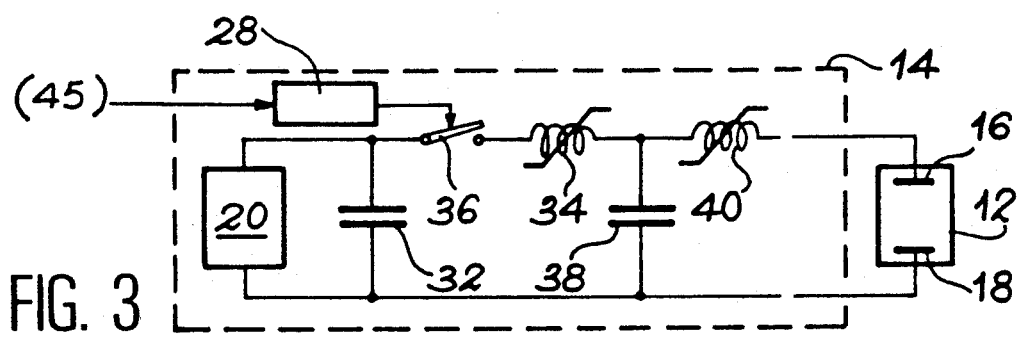

FIG. 3 diagrammatically another known embodiment of an excitation module.

Figure 4:
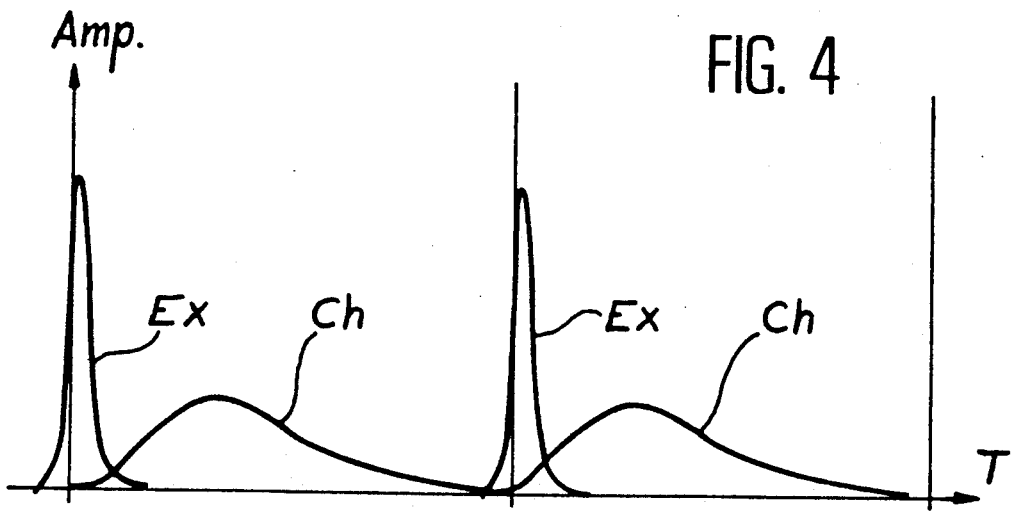

FIG. 4 diagrammatically a chronogram of the excitation and heating pulses.

Figure 5:
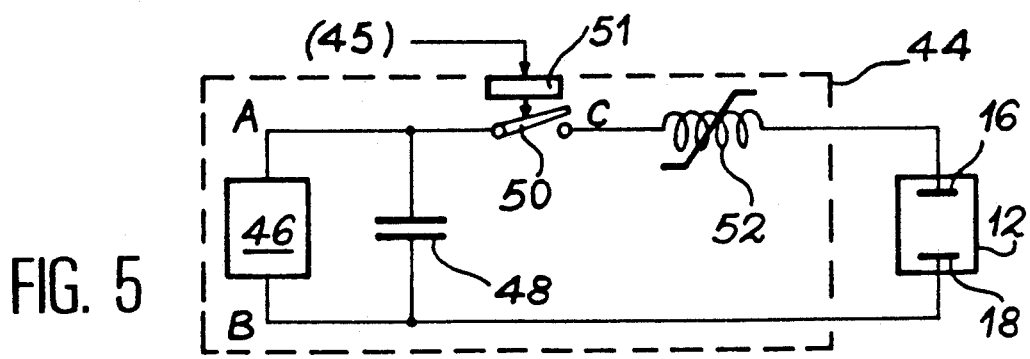

FIG. 5 diagrammatically an embodiment of a heating module according to the invention.

Figure 6:
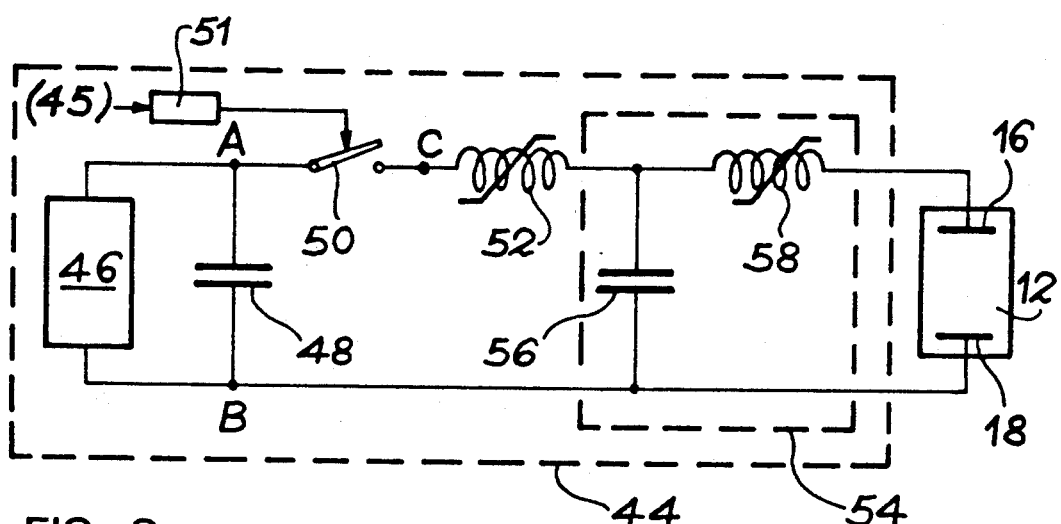

FIG. 6 diagrammatically a variant of the heating module according to the invention.

Figure 7:
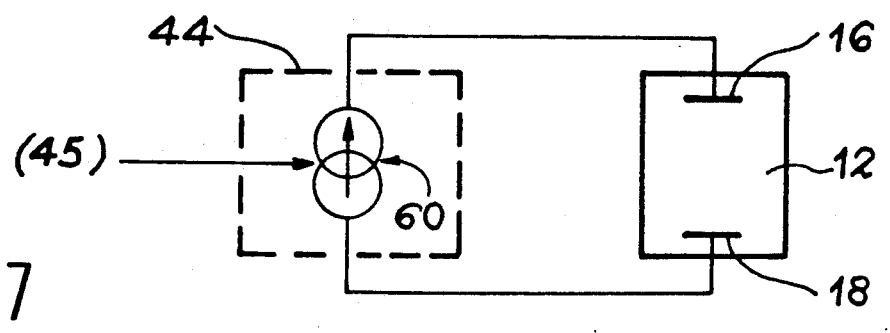

FIG. 7 diagrammatically another embodiment of a heating module according to the invention.

With reference to FIG. 1, a description will now be given of a metal vapour laser provided with a power source or supply according to the invention. The metal vapour 10 is created within an enclosure 12 by the vaporization of not shown, metal balls.

An excitation module 14 is connected to the electrodes 16,18 and supplies, in recurrent manner, at a frequency between a few Hz and several dozen kHz, a current pulse permitting the excitation of the vapour 10. Advantageously, said pulse lasts less than 100 nanoseconds and has a peak intensity of more than 1000 A. The metal is vaporized by applying an electric pulse in the enclosure 12.

This electric heating pulse is preceded by an ignition carried out by igniting means 42, which are constituted by a pulsed high voltage source. This high voltage of a few dozen kV is applied for between 0.1 and 10 microseconds between the electrodes 16 and 18.

Ignition makes it possible to vary the internal impedance of the enclosure 12 from a quasi-infinite value to a few Ohms.

In an advantageous embodiment, the ignition means coincide with the excitation module and in this case the electric excitation pulse is used for igniting the medium for the following excitation.

This is followed by the application of the heating pulse, which is thus produced by a system operating at low voltage. In a recurrent manner and in time relationship with the ignition, a heating module 44 supplies a heating pulse.

Control means 45 connected to the excitation module 14, the heating module 44 and optionally the ignition means 42 supply control signals for the alternating triggering of these modules.

Means 5 and 6 are connected on the one hand to the electrodes 16,18 and on the other respectively to the outputs of the excitation module 14 and the heating module 44. These means 5 and 6 permit an alternating, recurrent operation of the excitation and heating modules 14,44 respectively. The means 5 can be constituted by a high-pass filter and the means 6 by a low-pass filter.

A description will now be given of constructions of the different excitation and heating modules.

FIG. 2 diagrammatically shows a first embodiment of an excitation module 14. This module comprises a voltage source 20 permitting the charging of a capacitor 22 connected in parallel to the voltage source. A thyratron 26 is made to conduct under the control of a triggering means 28, which permits the discharge of the capacitor 22 through the thyratron. FIG. 2 also shows the high-pass filter 5 constituted by an inductance 3 connected to a capacitor 4.

FIG. 3 diagrammatically shows a second embodiment of a known type of excitation module 14. The latter comprises a voltage source 20 connected to a first magnetic compression stage. The latter is constituted by a capacitor 32 connected in parallel to the terminals of the voltage source 20 and connected to a saturatable inductance 34 via a switch 36 which can be of the semiconductor type and controlled by the triggering means 28.

When the switch 36 is closed, the saturatable inductance 34 acts as a second switch. Prior to saturation, the current flowing through the inductance is weak and rises suddenly on saturation.

The first magnetic compression stage is connected to a second magnetic compression stage formed by the capacitor 38 and the saturatable inductance 40. On saturating the inductance 34 of the first stage, the capacitor 38 charges rapidly. The saturation of the second inductance 40 leads to a rapid discharge in the laser head 12 via the high-pass filter 5.

In this embodiment and as can be seen in FIG. 4 diagrammatically showing a chronogram of the amplitude (Amp) of the electric excitation pulses Ex and heating pulses Ch, the excitation pulse Ex is also used for the ignition of the metallic medium with a view to heating. The triggering of the heating pulse Ch is controlled by means 28, which are e.g. synchronized with the maximum value of the excitation pulse Ex.

FIGS. 5 to 7 diagrammatically show embodiments of a heating module according to the invention. This module 44 makes it possible to supply current pulses of 100 amperes and lasting about ten microseconds.

In the embodiment of FIG. 5, the module 44 comprises a capacitor 48 connected in parallel to the terminals A and B of a low voltage source 46. The terminal A of the low voltage source is connected to a switch 50 connected at a point C to a saturatable inductance 52, which is itself connected to the electrode 16. The other terminal B of the supply source is connected to the electrode 18.

Under the action of the closing of the switch 50 triggered by the triggering means 51, which are themselves controlled by the control means 45 (FIG. 1), the capacitor 48 is discharged, saturating the inductance 52 and leading to a current pulse between the electrodes 16 and 18. The saturatable inductance 52 serving as an open switch when it is not saturated makes it possible to isolate the heating module during the supply of the excitation pulse.

FIG. 6 diagrammatically shows a constructional variant of the aforementioned device (FIG. 5). A magnetic compression stage 54 is added, being formed by a capacitor 56 and a saturatable inductance 58. The addition of a magnetic compression stage makes it possible to reduce the inductance of the circuit and therefore reduce the value of the critical damping resistance of the circuit. This leads to a better transfer of the energy supplied by the heating module. Moreover, the stage 54 forms a low-pass filter corresponding to integrated means 6 (FIG. 1). It therefore ensures the decoupling between the heating and excitation modules.

In FIG. 7, the module 44 is constituted by an externally triggered pulsed current source 60 and in this case the triggering is controlled by the control means 45 (FIG. 1). This pulsed current source supplies a current pulse at the required nominal value no matter what the impedance of the enclosure 12, which leads to an ignition economy. It can e.g. be constituted by a converter known as a flyback converter.

We claim:

1. An electric power supply for a laser, said laser comprising an active material, the power supply comprising an excitation module supplying electric pulses for the excitation of the active material, characterized in that said electric power supply also comprises a heating module supplying electric pulses for heating the active material and maintaining said active material at an operational temperature at which a laser effect occurs, following the excitation of the active material, as well as means for permitting the alternating, recurrent operation of the excitation and heating modules.

2. An electric power supply according to claim 1, characterized in that the heating module includes an externally triggered, pulsed current source.

3. An electric power supply according to claim 1, the active material being a metal, characterized in that said electric power supply comprises an ignition means for igniting the vaporization of the metal.

4. An electric power supply according to claim 1, the active material being a metal, wherein the heating module vaporizes said metal, and the excitation module excites said metal vapor.

5. An electric power supply for a metal vapor laser, the power supply comprising an excitation module supplying electric pulses for the excitation of the metal vapor and a heating module supplying electric pulses for vaporizing the metal and maintaining the vapor at a temperature at which lasing occurs, following the excitation of the vapor, as well as means for permitting the alternating, recurrent operation of the excitation and heating modules.

6. An electric power supply for a laser, said laser including an active material, a power supply including an excitation module supplying electric pulses for excitation of the active material, characterized in that said electric power supply also includes a heating module supplying electric pulses for heating the active material and maintaining said active material at an operational temperature at which a lasing occurs, means for permitting the alternating, recurrent operation of the excitation and heating modules, and wherein said heating module includes a circuit arrangement comprising a voltage source having two terminals A and B, a capacitor connected in parallel to the terminals A and B, a switch connected to the voltage source and a saturatable inductance connected at a point C to the switch, said circuit arrangement thus permitting alternate, recurrent operation with said excitation module.

7. An electric power supplying according to claim 6, characterized in that the heating module also comprises a magnetic compression stage having a capacitor connected to said saturatable inductance.

8. An electric power supply according to claim 6, wherein the active material is a metal, characterized in that said electric power supply comprises an ignition means for igniting the vaporization of the metal.

9. An electric power supply according to claim 6, wherein the active material is a metal, and wherein the heating module vaporizes said metal and the excitation module excites said metal vapor.

10. An electric power supply for a laser, said laser including an active material, the power supply comprising an excitation module supplying electric pulses for the excitation of the active material, characterized in that said electric power supply also comprises a heating module supplying electric pulses for heating the active material and maintaining said active material at an operational temperature at which a lasing occurs, means for permitting the alternating, recurrent operation of the excitation and heating modules, comprising a highpass filter connected at the output of the excitation module and a low-pass filter connected at the output of the heating module.

11. An electric power supply according to claim 10, wherein the active material is a metal, characterized in that said electric power supply comprises an ignition means for igniting the vaporization of the metal.

12. An electric power supply according to claim 10, wherein the active material is a metal, and wherein the heating module vaporizes said metal and the excitation module excites said metal vapor.

* * * * *